US005757536A

United States Patent [19]
Ricco et al.

[11] Patent Number: 5,757,536
[45] Date of Patent: May 26, 1998

[54] ELECTRICALLY-PROGRAMMABLE DIFFRACTION GRATING

[75] Inventors: Antonio J. Ricco; Michael A. Butler; Michael B. Sinclair, all of Albuquerque, N. Mex.; Stephen D. Senturia, Brookline, Mass.

[73] Assignee: Sandia Corporation, Albuquerque, N. Mex.

[21] Appl. No.: 521,559

[22] Filed: Aug. 30, 1995

[51] Int. Cl.$^6$ .............................. G02B 26/00; G02B 5/18
[52] U.S. Cl. .................. 359/224; 359/225; 359/291; 359/295; 359/573
[58] Field of Search ........................ 359/223, 224, 359/225, 226, 230, 231, 290, 291, 292, 295, 296, 573, 855; 216/24

[56] References Cited

U.S. PATENT DOCUMENTS

| | | | |
|---|---|---|---|
| 3,752,563 | 8/1973 | Torok et al. | 359/280 |
| 3,861,784 | 1/1975 | Torok | 359/573 |
| 4,011,009 | 3/1977 | Lama et al. | 359/571 |
| 4,229,732 | 10/1980 | Hartstein et al. | 340/815.4 |
| 4,698,602 | 10/1987 | Armitage | 359/294 |
| 4,736,132 | 4/1988 | Culp | 310/333 |
| 5,061,049 | 10/1991 | Hornbeck | 359/224 |
| 5,078,479 | 1/1992 | Vuilleumier | 359/290 |
| 5,115,344 | 5/1992 | Jaskie | 359/573 |
| 5,142,405 | 8/1992 | Hornbeck | 359/226 |
| 5,233,456 | 8/1993 | Nelson | 359/214 |
| 5,311,360 | 5/1994 | Bloom | 359/572 |
| 5,312,513 | 5/1994 | Florence et al. | 216/24 |
| 5,331,454 | 7/1994 | Hornbeck | 359/224 |
| 5,497,262 | 3/1996 | Kaeriyama | 359/223 |
| 5,552,924 | 9/1996 | Tregilas | 359/224 |
| 5,579,151 | 11/1996 | Cho | 359/291 |

OTHER PUBLICATIONS

J. H. Jerman, et al., "A Miniature Fabry–Perot Interferometer with a corrugated Silicon Diaphragm Support", *Sensors and Actuators A*, (29) pp. 151–158, no month 1991.

K. E. Petersen, "Micromechanical Light Modulator Array Fabricated on Silicon," *Applied Physics Letters*, vol. 31, pp. 521–523, 15 Oct. 1977.

L. J. Hornbeck, "Deformable–Mirror Spatial Light Modulators," *Society of Photoinstrumentation Engineers Critical Reviews of Optical Science and Technology*, vol. 1150, pp. 86–102, 1989. No Month.

J. H. Jerman and D. J. Clift, "Miniature Fabry–Perot Interferometers Micromachined in Silicon for Use in Optical Fiber WDM Systems," *IEEE 1991 International Conference on Solid–State Sensors and Actuators Digest of Technical Papers*, pp. 372–375, 1991. No Month.

R. M. Boysel, "A 128 x 128 Frame–Addressed Deformable Mirror Spatial Light Modulator," *Optical Engineering*, vol. 30, No. 9 pp. 1422–1427, Sep. 1991.

O. Solgaard, F.S.A. Sandejas, and D. M. Bloom, "Deformable Grating Optical Modulator," *Optics Letters*, vol. 17, No. 9 pp. 688–690, May 1, 1992.

Y. B. Gianchandani and K. Najafi, "A Bulk Dissolved Wafer Process for Microelectromechanical Devices," *Journal of Microelectromechanical Systems*, vol. 1, No. 2, pp. 77–85, Jun. 1992.

(List continued on next page.)

*Primary Examiner*—Thong Nguyen
*Assistant Examiner*—John Juba, Jr.
*Attorney, Agent, or Firm*—John P. Hohimer

[57] ABSTRACT

An electrically-programmable diffraction grating. The programmable grating includes a substrate having a plurality of electrodes formed thereon and a moveable grating element above each of the electrodes. The grating elements are electrostatically programmable to form a diffraction grating for diffracting an incident beam of light as it is reflected from the upper surfaces of the grating elements. The programmable diffraction grating, formed by a micromachining process, has applications for optical information processing (e.g. optical correlators and computers), for multiplexing and demultiplexing a plurality of light beams of different wavelengths (e.g. for optical fiber communications), and for forming spectrometers (e.g. correlation and scanning spectrometers).

32 Claims, 8 Drawing Sheets

Section 4-4

OTHER PUBLICATIONS

W. C. Tang, M. G. Lim and R. T. Howe, "Electrostatic Comb Drive Levitation and Control Method," *Journal of Microelectromechanical Systems*, vol. 1, No. 4, pp. 170–178, Dec. 1992.

M.A. Huff, A. D. Nikolich, and M. A. Schmidt, "Design of Sealed Cavity Microstructures Formed by Silicon Wafer Bonding," *Journal of Microelectromechanical Systems*, vol. 2, No. 2, pp. 74–81, Jun. 1993.

Y. Zhang and K. D. Wise, "Performance of Non–Planar Silicon Diaphragms Under Large Deflections," *Journal of Microelectromechanical Systems*, vol. 3, No. 2, pp. 59–68, Jun. 1994.

V. Temesvary, S., Wu, W. H. Hsieh, Y.–C. Tai, and D. K. Miu, "Design, Fabrication, and Testing of Silicon Microgimbals for Super–Compact Rigid Disk Drives," *Journal of Microelectromechanical Systems*, vol. 4, No. 1, pp. 18–27, Mar. 1995.

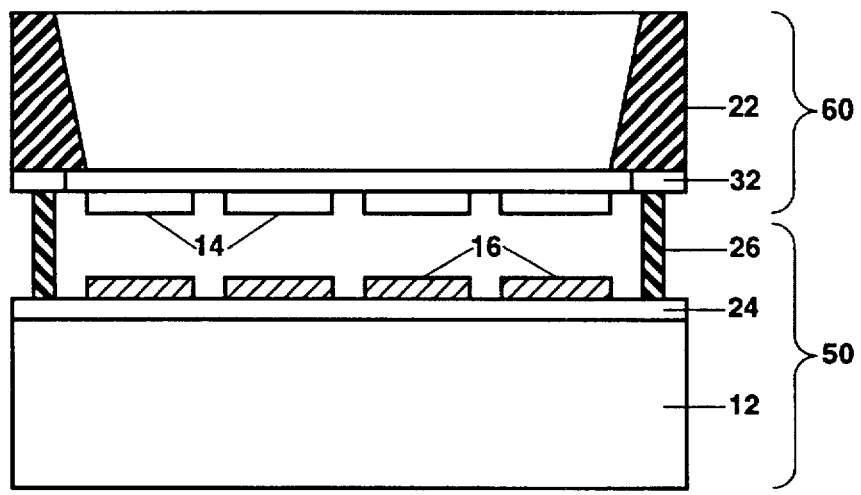
FIG. 3a  Section 1 - 1
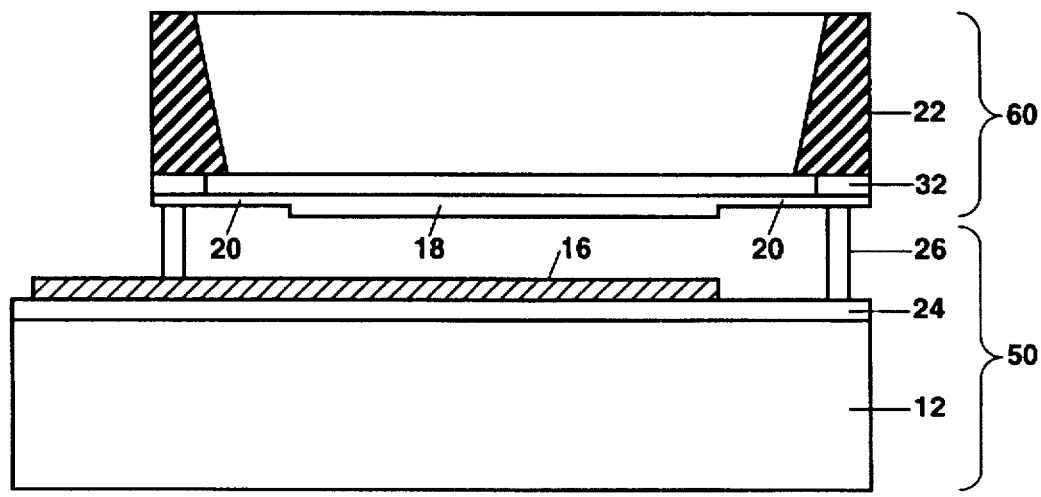
FIG. 3b  Section 2 - 2

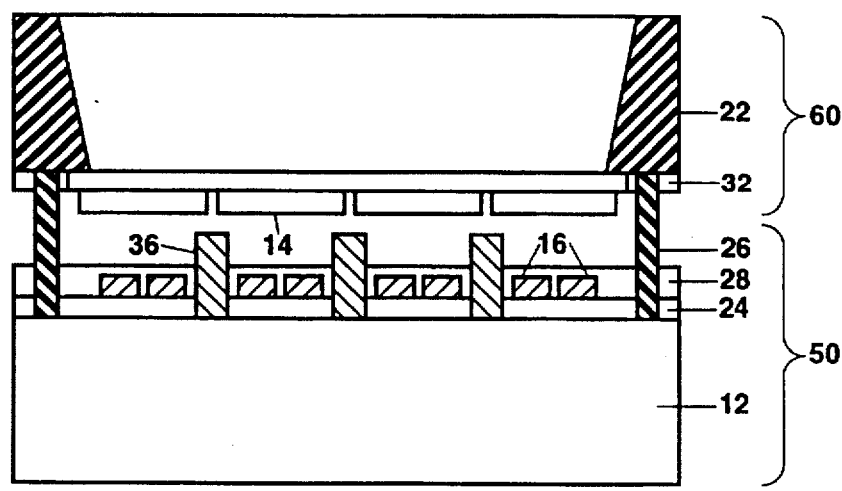
FIG. 7a        Section 3 - 3
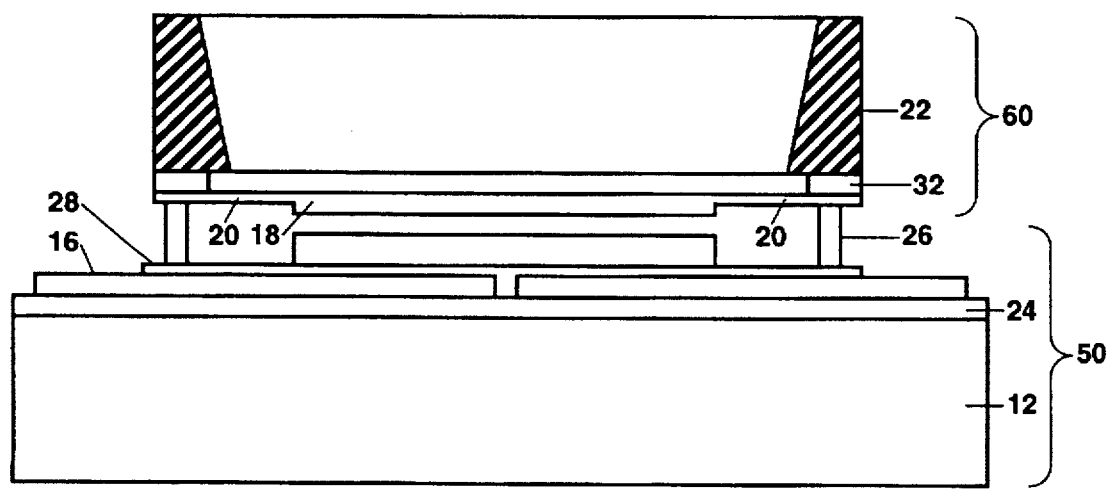
FIG. 7b        Section 4 - 4

ELECTRICALLY-PROGRAMMABLE DIFFRACTION GRATING

This invention was made with Government support under Contract No. DE-AC04-94AL85000 awarded by the U.S. Department of Energy. The Government has certain rights in the invention.

FIELD OF THE INVENTION

The present invention relates to an apparatus for diffracting a beam of light, and more particularly to an electrically-programmable diffraction grating having a plurality of independently programmable grating elements therein.

BACKGROUND OF THE INVENTION

Diffraction gratings may be used for processing light beams for applications including spectroscopy and optical information processing. In spectroscopy, diffraction gratings provide a means for dispersing a spectrum of polychromatic light for qualitatively and quantitatively analyzing matter according to spectral signatures. And in optical information processing, diffraction gratings may be used for performing optical correlation and optical computing functions; or for combining (i.e. multiplexing) and separating (i.e. de-multiplexing) a plurality of optical beams of different wavelengths (e.g. for fiber optic communications).

In the prior art, diffraction gratings have generally been formed with a fixed and unchangeable structure as, for example, by a ruling or holographic exposure process. The prior art contains limited references to diffraction gratings that are programmable to alter some aspect or function thereof.

U.S. Pat. Nos. 3,752,563 and 3,861,784 to Torok et al disclose a diffraction grating that utilizes the domain walls between adjacent stripe domains in a magnetic film as grating elements. The domain wall spacing may be altered by an applied magnetic field to change the width of the grating elements and thereby alter an angle of deflection of an incident light beam.

U.S. Pat. No. 4,011,009 to Lama et al discloses a diffraction grating having a controllable blaze angle. The programmable diffraction grating of Lama et al comprises on a substrate a uniform film of an elastomeric material. The application of a voltage to electrodes above and below the elastomeric material acts to deform the material in a manner dependent upon the electric field strength of the applied voltage, resulting in the production of a diffraction grating having a plurality of grating elements all inclined at a predetermined blaze angle with respect to the surface of the undeformed elastomeric film (i.e. a repeating sawtooth profile), with the blaze angle varying in response to the magnitude of the applied voltage. The use of a deformable elastomeric material for forming a programmable diffraction grating is disadvantageous in distorting the grating profile from that of an idealized grating structure and thereby introducing a background or noise component into the diffracted radiation pattern.

U.S. Pat. No. 4,736,132 to Culp also discloses a diffraction grating having a controllable blaze angle. The programmable diffraction grating of Culp comprises a plurality of segmented piezoelectric elements having parallel optical surfaces thereon. The application of a voltage to a central electrode and two side electrodes of each piezoelectric element produces a shear deformation of the piezoelectric element, thereby rotating the optical surface at an angle with respect to the undeformed element. A disadvantage of the Culp patent is the very high voltages of up to about 1000 volts that may be required for operation of the device.

U.S. Pat. No. 5,115,344 to Jaskie discloses a diffraction grating having two enmeshed finger-like rows of electrodes formed in a plane above an optically-transparent deformable material such as a polymer or elastomer for use with a light beam that is directed along (i.e. parallel to) the plane of the electrodes. The application of a voltage across the two rows of electrodes acts to electrostatically increase or decrease an in-plane spacing of the two rows allowing different wavelengths of light to be diffracted.

U.S. Pat. No. 5,061,049 to Hornbeck discloses an electrostatically deflectable beam spatial light modulator formed by a micromachining process. The Hornbeck patent teaches angular rotation of a micromachined torsion beam by an applied voltage for forming a spatial light modulator, but contains no teaching about translation of a beam in a vertical direction normal to a substrate without rotation.

U.S. Pat. No. 5,311,360 to Bloom et al discloses a programmable diffraction grating for use as a spatial light modulator. The programmable diffraction grating of Bloom et al comprises electrostatically deformable elements that are spaced apart by the width of the beams, with all the deformable elements being electrically interconnected for movement in unison. The interconnected deformable elements move digitally between two positional states defined as a first configuration wherein all of the deformable elements are in a rest position and act to reflect an incident beam of light (directed normal to the substrate) as a plane mirror, and a second configuration wherein all of the deformable elements are in physical contact with the substrate and act to diffract the incident beam of light as it is reflected therefrom. In operation of the Bloom et al patent, the light-reflective surfaces of the deformable elements remain parallel to each other in switching between the first and second configurations, so that there is no possibility for independently addressing or motion of individual elements. Furthermore, the spacing between the light-reflective surfaces of the deformable elements and the underlying substrate in the first and second configurations or states is constrained to be equal to an even or odd multiple of ¼ times the wavelength of the incident light rays (which are directed normal to the light-reflective surface), making the device useful only over a limited wavelength range.

An advantage of the present invention is that a plurality of grating elements are provided that are independently addressable and independently moveable.

Another advantage of the present invention is that each grating element may be electrostatically actuated to provide a range of translatory motion (i.e. uniform motion in one dimension) without deflection (i.e. tilting).

A further advantage of the present invention is that the grating elements of the programmable diffraction grating may have a range of translatory motion that is continuous to provide for operation over wide wavelength and angular ranges for one or more incident light beams.

Still another advantage of the present invention is that the programmable diffraction grating may be formed on a silicon substrate as an integrated device with at least a portion of the addressing circuitry for the electrically-programmable diffraction grating being formed on the substrate.

Yet another advantage of the present invention is that the programmable diffraction grating may have a plurality of grating elements in a multi-periodic spaced relationship for directing a plurality of wavelengths of light to a common point in space.

These and other advantages of the electrically-programmable diffraction grating of the present invention will become evident to those skilled in the art.

SUMMARY OF THE INVENTION

Accordingly, it is a primary object of the present invention to provide an electrically-programmable diffraction grating that may be produced by a micromachining process.

An additional object of the present invention is to provide an electrically-programmable diffraction grating and associated addressing circuitry (including closed-loop feedback control circuitry) that may be formed compactly on the same substrate.

A further object of the present invention is to provide an electrically-programmable diffraction grating for which an angle of diffraction of one or more incident light beams may be controlled and varied by the application of programming voltages to a plurality of grating elements therein.

Still another object of the present invention is to provide an electrically-programmable diffraction grating in which a plurality of grating elements may undergo translatory motion without deflection or angular rotation.

Yet a further object of the present invention is to combine the foregoing attributes in a single device wherein desirable actions are performed with very high speed and precision.

Additional objects, advantages, and novel features of the invention will become apparent to those skilled in the art upon examination of the following description, or may be learned by practice of the invention. The objects and advantages of the invention may be realized and attained by means of the instrumentalities and combinations particularly pointed out in the appended claims.

To achieve the foregoing and other objects, and in accordance with the purposes of the present invention as described herein, an electrically-programmable diffraction grating is provided for receiving an incident beam of light and generating a diffracted beam of light therefrom. The apparatus comprises a substrate having a plurality of elongated grating elements supported thereabove in a horizontal spaced relationship with a substantially equal spacing between adjacent grating elements. Each grating element comprises a central portion connected at each end thereof to at least one flexible member which is further attached to a support frame above the substrate and surrounding the plurality of grating elements. The central portion of each grating element further includes a light-reflective upper surface and forms, at least in part, a moveable electrode. At least one stationary electrode is formed on the substrate below each grating element for forming in combination with the moveable electrode a set of electrodes for electrostatically defining a substantially parallel vertical spaced relationship between the light-reflective upper surface of each grating element and adjacent grating elements for diffracting the incident light beam as it is reflected from the upper surfaces of the grating elements. Thus, the central portion of each grating element is independently operable, having a translatory motion (i.e. motion in a direction normal to the plane of the substrate) that is variable, being determined and controlled by the application of a programming voltage between the stationary and moveable electrodes thereof.

Other objects, advantages and novel features of the invention will become apparent from the following detailed description thereof when considered in conjunction with the accompanying drawings.

BRIEF DESCRIPTION OF THE DRAWINGS

The accompanying drawings, which are incorporated into and form a part of the specification, illustrate several aspects of the present invention and, together with the description, serve to explain the principles of the invention. The drawings are only for the purpose of illustrating preferred embodiments of the invention and are not to be construed as limiting the invention. In the drawings:

FIGS. 3a and 3b show cross-section views of the first embodiment of the programmable diffraction grating along the lines A—A and B—B in FIG. 2.

FIGS. 7a and 7b show cross-section views of the second embodiment of the programmable diffraction grating along the lines C—C and D—D in FIG. 6.

DETAILED DESCRIPTION OF THE INVENTION

Figure 1:
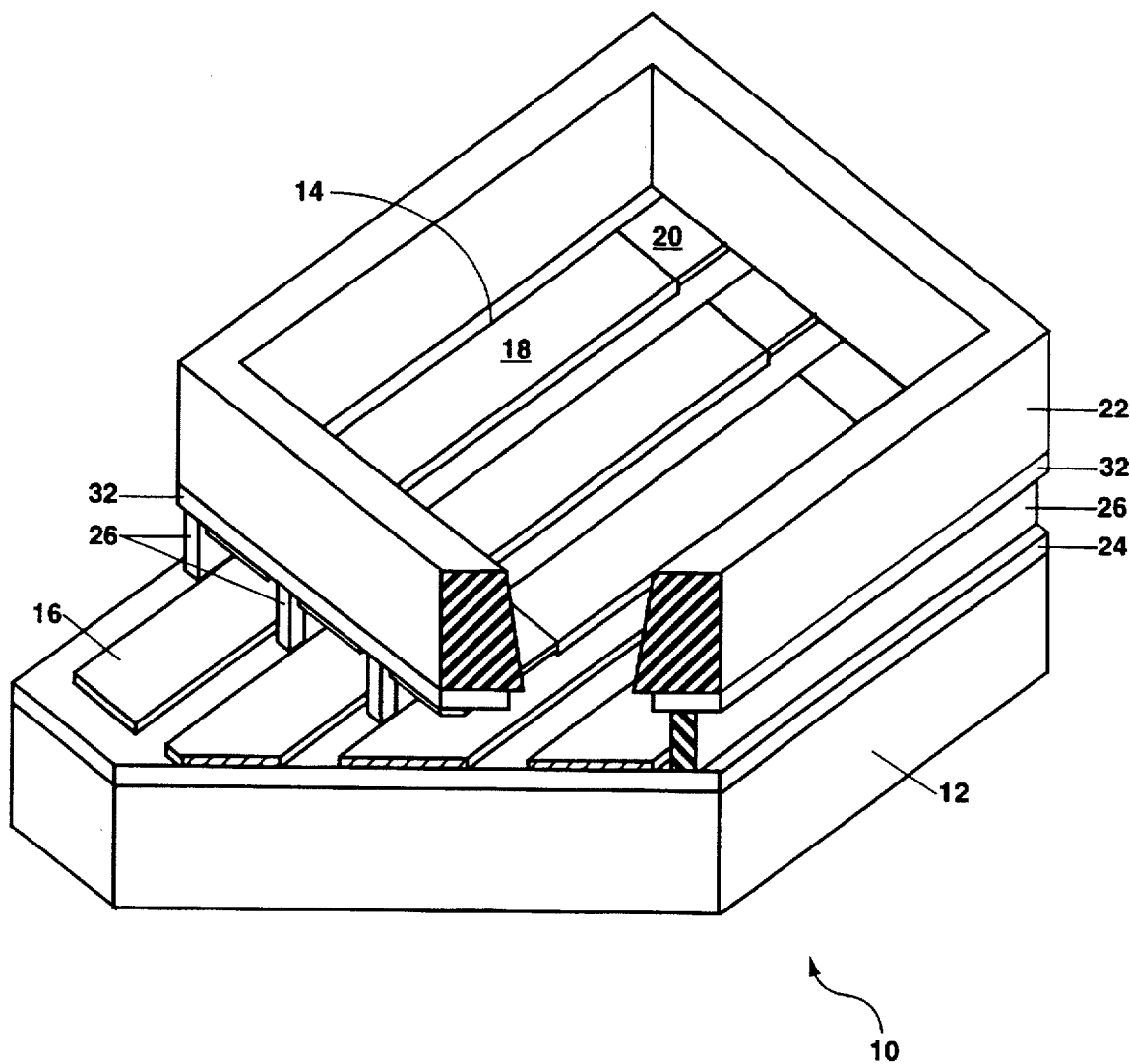
FIG. 1 shows a partially cut-away perspective view of the programmable diffraction grating according to a first embodiment of the present invention.
Figure 2:
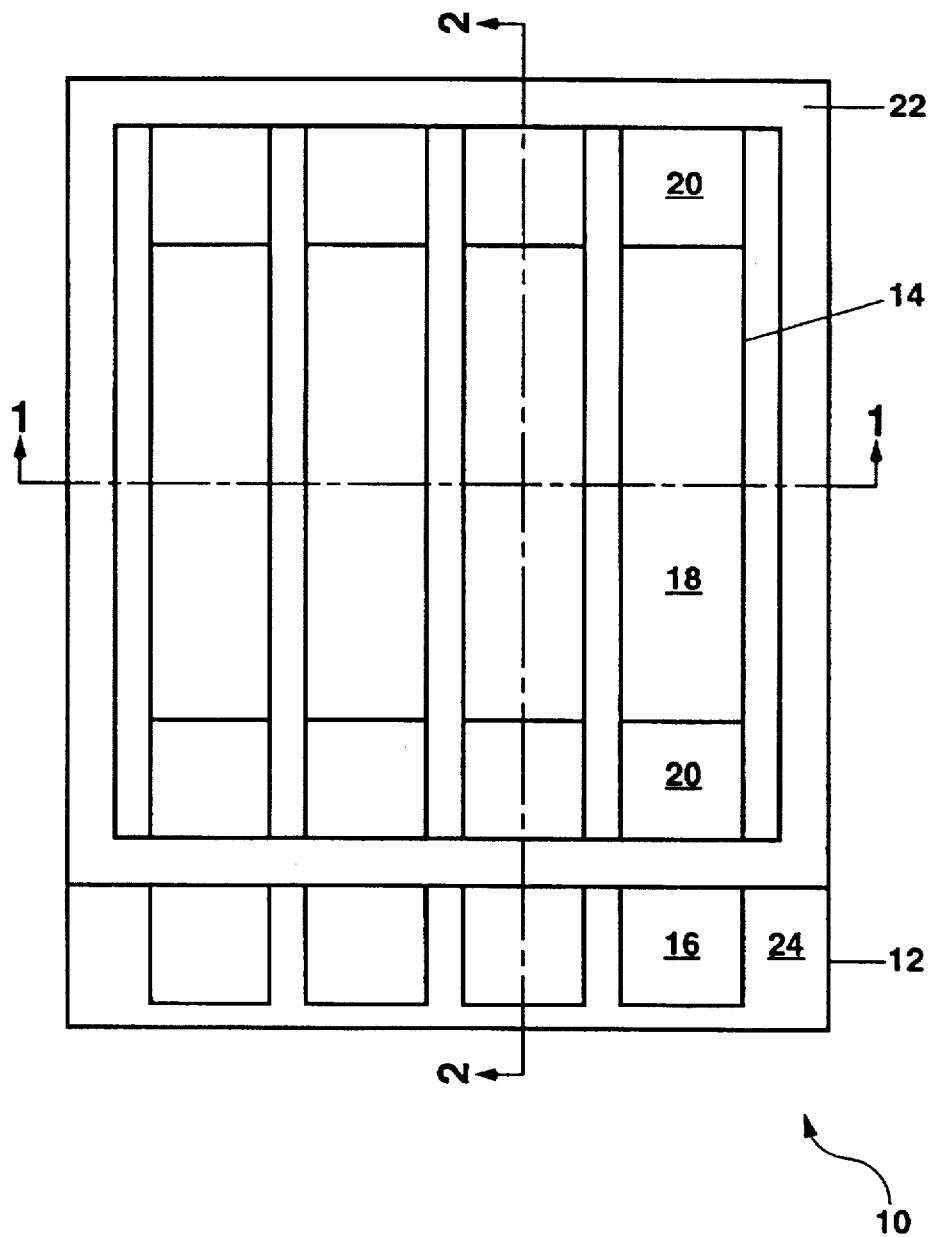
FIG. 2 shows a plan view of the programmable diffraction grating according to a first embodiment of the present invention.

A first preferred embodiment of an electrically-programmable diffraction grating 10 is illustrated in perspective view in FIG. 1, in plan view in FIG. 2, and in cross-section views in FIG. 3. The programmable diffraction grating 10 is preferably formed as a linear 1×n array of grating elements, with each grating element being individually addressable for translatory motion in a direction normal to the plane of a substrate (i.e. in the vertical direction in FIGS. 1 and 3). For clarity of explanation, the number of grating elements 14 in FIGS. 1–8 are limited; however, the programmable diffraction grating of the present invention may have any number, n, of grating elements up to 1024 or more depending on a particular application for which the programmable diffraction grating 10 is to be used.

The apparatus 10 comprises a substrate 12 having a plurality of elongated grating elements 14 supported thereabove in a horizontal spaced relationship with a substantially equal spacing between adjacent grating elements, and at least one stationary electrode 16 below each grating element for electrostatically activating the element (in combination with a moveable electrode on the element 14) for translatory motion thereof. (Translatory motion is defined herein as uniform motion in the vertical dimension normal to the plane of the substrate.) Each grating element 14 comprises an elongate central portion 18 connected at each end thereof to at least one flexible member 20 for attachment to a support frame 22 surrounding the plurality of grating elements. The central portion 18 of each grating element 14 further includes a light-reflective upper surface. (Light is defined herein to include any wavelength of optical radiation from the ultraviolet through the infrared regions of the spectrum covering wavelengths from about 0.2 to 20 microns.) A programming voltage may be applied between one or more stationary electrodes 16 and a moveable electrode thereabove (formed at least in part by the central portion 18) for electrostatically defining and controlling a substantially planar vertical spaced relationship between each grating element and adjacent grating elements, and thereby acting to diffract one or more incident beams of light reflected from the upper surfaces of the grating elements.

The substrate 12 preferably comprises a semiconductor such as (100) silicon, especially for embodiments of the present invention wherein peripheral devices (e.g. addressing circuitry which is defined herein as any form of electronic circuitry for addressing the grating elements and supplying programming voltages thereto, and which may include feedback-control circuitry for controlling and maintaining a predetermined vertical spaced relationship of the grating elements) are formed on the substrate in addition to stationary electrodes 16. However, for other embodiments of the present invention wherein such peripheral devices are not formed on the substrate, the substrate may comprise other materials such as a metal, glass, ceramic, sapphire, or the like.

If the substrate 12 is electrically conductive, then a thin (e.g. a few microns or less) insulating layer 24 as shown in FIG. 1 may be provided above the substrate for electrical isolation of the stationary electrodes 16. The insulating layer 24 may be formed on the substrate (e.g. silicon dioxide, silicon nitride, polyimide, spin-on glass, or the like) by a deposition process; or the layer 24 may be formed by a chemical reaction with the underlying substrate (e.g. a thermal oxide of silicon formed on the surface of a silicon substrate). The insulating layer 24 may further be photolithographically patterned to provide electrical interconnections to the underlying substrate and/or peripheral devices located on the substrate.

The first embodiment of the programmable diffraction grating 10 of FIGS. 1–3 may be formed according to a preferred process as illustrated by way of the cross-section views presented in FIGS. 4 and 5. The device 10 is preferably formed by fabricating a lower portion 50 as shown in FIG. 4 and an upper portion 60 as shown in FIG. 5, with the two portions being joined together to form the completed device 10 as shown in the cross-section view of FIG. 3a.

Figure 4A:
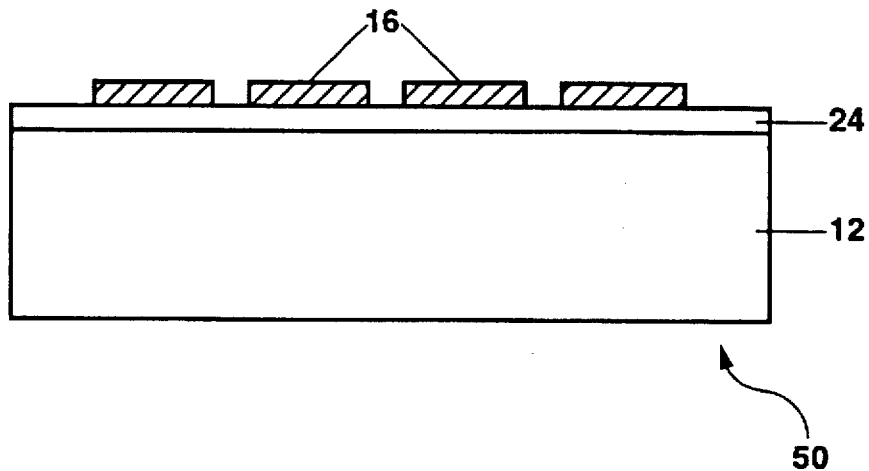
FIGS. 4a–b and FIGS. 5a–d are cross sections illustrating a preferred process for manufacturing the programmable diffraction grating according to the first embodiment of the present invention of FIGS. 1–3.

FIG. 4a shows formation of a plurality of stationary electrodes 16 on the substrate 12 by a deposition or sputtering process. The stationary electrodes may be formed of any metal or metal alloy (e.g. aluminum, gold, tungsten, or the like) that may be deposited by evaporation or sputtering and photolithographically patterned to provide a horizontal spaced relationship substantially matching the spaced relationship of the overlying grating elements 14 in the completed device. The particular metal or metal alloy used for the electrodes will generally depend on the composition of the underlying substrate, and whether or not addressing circuitry is provided on the substrate. For example, when CMOS addressing circuitry is provided on a silicon substrate, the electrodes may be formed of aluminum or an aluminum alloy to allow the electrodes to be formed by the same semiconductor processing steps used for interconnecting the CMOS devices forming the addressing circuitry. Thus, the stationary electrodes in some embodiments of the present invention may form a part of a multi-layer interconnect metallization.

A multi-layer metallization may also be preferred when more than one stationary electrode 16 is provided below each grating element 14. A plurality of stationary electrodes underlying each grating element may be preferred, for example, to provide for an accurate (i.e. substantially planar) translatory motion of each grating element while minimizing any deformation or tilting of the central portion thereof; or to include one or more sensory electrodes for capacitively sensing (in combination with the moveable electrode) the vertical position of each grating element and providing an electrical input to control circuitry within the addressing circuitry for maintaining and controlling the vertical spaced relationship between adjacent grating elements by means of a closed feedback loop. In these examples, a multi-layer metallization may be preferred for making electrical connections to the separate electrodes 16.

Figure 4B:
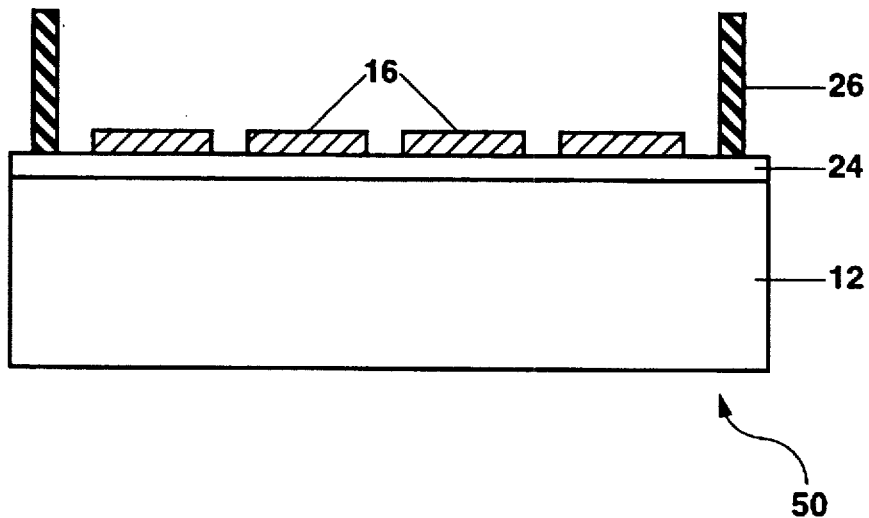

FIG. 4b shows formation of one or more support posts 26 that are provided for attachment of the upper portion 60 of FIG. 5 to the lower portion 50 of FIG. 4 for forming the completed device 10. The support posts 26 preferably comprise a metal or metal alloy (e.g. copper, gold, nickel, or the like) formed above the substrate preferably by initially depositing and patterning a thin seed layer of the metal or metal alloy and then forming the remainder of the support post by a metal plating process. In this manner, either a single annular support post being matched in size to the support frame 22 or a plurality of smaller square, rectangular, or otherwise shaped support posts may be formed. The exact shape and number of support posts for a particular embodiment of the present invention may depend on several factors including the number and size of stationary electrodes 16; whether or not the supports post also act as electrical interconnections between the moveable electrodes of the grating elements and one or more ground electrodes on the substrate, or to the substrate itself; and whether or not a passivation layer 28 is provided above the stationary electrodes 16 (as shown in FIG. 7) to protect and/or electrically isolate the stationary electrodes, at least in part. The height of the support posts 26 may be in the range of about 2 to 30 microns and will depend upon a wavelength range and an angle of incidence, $\theta_i$, of the light beams being processed by the device during operation thereof, in addition to the above factors. After the plating step, a mechanical or chemical-mechanical polishing step may be used to define an exact height for the support posts 26 and to planarize the top surfaces of the posts.

A process for forming the upper portion 60 of the first embodiment of the programmable diffraction grating 10 is illustrated in FIGS. 5a–5d. The upper portion 60 is preferably formed according to the art of silicon micromachining.

Figure 5A:
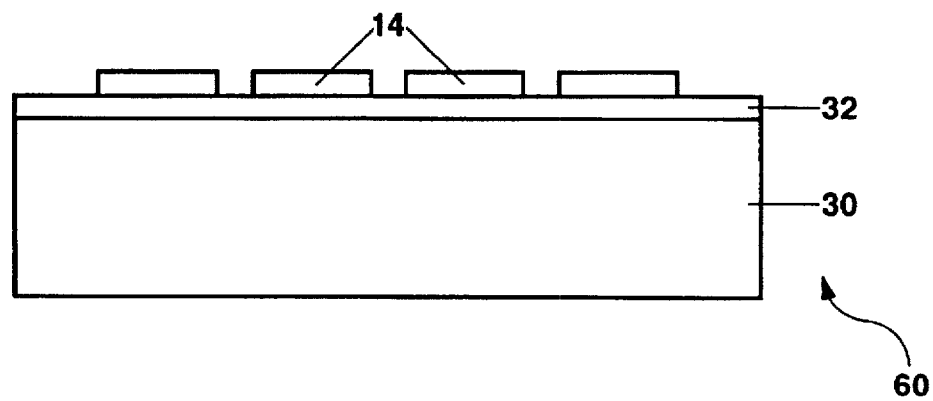

In FIG. 5a, a wafer 30 of a micromachineable material such as silicon is provided for later forming support frame 22 in the process step of FIG. 5c. A support layer 32 is formed on the wafer 30; and one or more grating layers are formed above the support layer.

The support layer 32 may comprise one or more layers of materials such as silicon dioxide (also termed oxide), silicon nitride (also termed nitride), or the like that are deposited above the wafer 30, or formed by a chemical reaction therewith. The support layer 32 is preferably formed so that any overall net stress within the layer 32 is tensile rather than compressive to prevent the possibility for buckling or fracture of the grating elements 14 during a subsequent etch release process wherein the support layer is etched away from the overlying grating elements to free the grating elements for translatory motion.

A silicon dioxide support layer 32 may be formed, for example, either by deposition or by growing a thermal oxide (i.e. silicon dioxide formed by a wet oxidation process) on an outer surface of a silicon wafer 30. To produce a net tensile stress in the support layer 32, the silicon dioxide is preferably overcoated with a layer of silicon nitride. Alternately, the support layer 32 may comprise silicon nitride.

The support layer 32 may have a thickness of up to about one micron, and is used to provide an etch stop during micromachining of the overlying grating layers for forming the grating elements 14. A smooth lower surface of each grating element may be preferred; and this in turn may lead to a preferred process for forming the support layer 32. Thus, it may be preferable to form a thermal oxide (i.e. silicon dioxide formed by thermally oxidizing the outer surface of a silicon wafer in the presence of moisture at a high temperature of about 1000° C.) support layer 32 on a polished silicon wafer 30 since the outer surface of the oxide layer will retain the smoothness of the silicon wafer.

One or more grating layers are formed above the support layer 32, with the grating layers comprising at least one micromachineable material selected from the group consisting of silicon (including polycrystalline silicon, also termed polysilicon), silicon dioxide, silicon nitride, and metals (e.g. aluminum, gold, silver, nickel, tungsten and alloys thereof). Polysilicon and silicon nitride grating layers may be formed by a deposition process such as Low Pressure Chemical Vapor Deposition (LPCVD); silicon dioxide grating layers may be formed by deposition or by a thermal oxidation process (e.g. in a polysilicon grating layer); and the metal grating layers may be sputter deposited. The grating layers are used for formation of the elongate central portion or beam 18 of each grating element 14 and surrounding flexible members 20 at either end thereof by photolithographic patterning and micromachining steps for selectively removing portions of the grating layers and thereby defining the central portion and flexible members of the grating elements.

The thickness of the flexible members (i.e. springs) is preferably substantially smaller than the thickness of the central portion of the grating elements so that the flexible members are deformable during operation of the device while the central portion remains substantially planar (i.e. undeformed) while undergoing translatory motion as a rigid body. The ability of the central portion to remain substantially planar and rigid while the flexible members are deformable is made possible by the dependence of bending stiffness of a plate on the third power of its thickness. Thus, by providing a central portion that has, for example, three times the thickness of the flexible members, the rigidity of the central portion will be increased over that of the flexible members by a factor of 27.

The flexible members 20 may be formed by methods known to those skilled in the art of micromachining. For example, the flexible members 20 may have a leaf-spring structure as shown in FIGS. 1–3, with each flexible member being substantially planar with a thickness of about one-third or less of the thickness of the central portion of the grating elements.

As another example, the flexible members 20 may have an etch-stopped corrugated hinge structure formed by etching a plurality of parallel corrugations aligned substantially along a minor axis of the elongate element. Such a corrugated hinge structure may be formed by etching the corrugations into the exposed upper surface of the grating layers at the location of each flexible member, and then diffusing or ion implanting an etch-stop species (e.g. a boron impurity dopant diffused or ion implanted to an impurity concentration of about $5 \times 10^{19}$ cm$^{-3}$ or more) into polysilicon through a native oxide mask into the etched region for forming a corrugated etch-stop layer. Subsequent etching to remove the material underlying the etch-stop layer may be performed with a dopant-selective etchant such as ethylenediamine pyrocatechol, tetramethyl ammonium hydroxide, or the like that etches the unmodified and unmasked portions of the grating layers at a much higher rate than for the etch-stop layer and the support layer 32, thereby forming the corrugated hinge structure. (The formation of the flexible members 20 may proceed either by etching the grating layers from the exposed surfaces thereof during the process step of FIG. 5a; or during the later process step of FIG. 5d wherein the grating elements are released from contact with the support layer 32. Such a corrugated hinge structure may be advantageous for providing an increased range of translatory motion while providing an increased resistance to tilting of the central portion of the grating element about a major axis of the elongate element.

Alternately, one of the wafer 30, the support layer 32, or a first-formed grating layer (preferably comprising silicon dioxide) may be patterned and etched to provide a plurality of parallel corrugations therein aligned substantially along the minor axis of the elongate element, thereby forming a mold. Layers (including the hinge-forming grating layer) deposited above the mold may then conform to the shape of the mold forming the corrugated flexible members 20, with any material layers (e.g. the support layer 32 and/or silicon dioxide grating layer) between the wafer 30 and the corrugated flexible members 20 being removable selective etching (which may also be used for releasing the grating elements 14 as described hereinafter).

As yet another example, each flexible member 20 may comprise a pair of juxtaposed serpentine planar microsprings, with one end of each microspring preferably being attached near a corner of the central portion of the grating element, and the other end of each microspring being attached to the support frame 22 by support layer 32. Each serpentine planar microspring comprises a plurality of curved cantilever beams joined together end-to-end; and may have either a uniform beam width or a non-uniform beam width that progressively increases from a point of contact with the central portion outward to the point of contact with the support frame. Such juxtaposed serpentine planar microsprings, formed according to the art of micromachining, may also be advantageous for providing an increased range of translatory motion while providing an increased resistance to tilting of the central portion.

In FIG. 5a, the central portion 18 of the grating elements is similarly defined by photolithographic patterning and micromachining, with formation of the central portion generally occurring simultaneously with formation of the flexible members 20 (although the central portion may be masked during some of the process steps for forming flexible members comprising corrugated hinges or serpentine planar microsprings).

Figure 8:
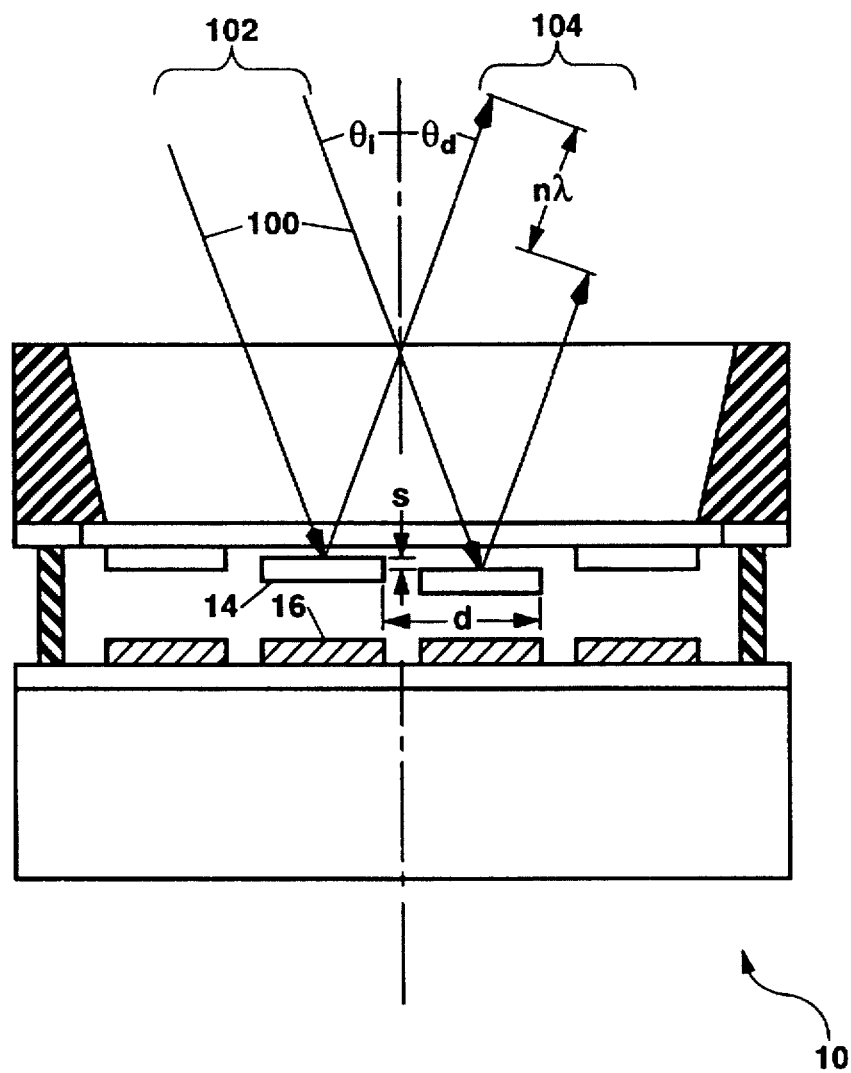
FIG. 8 illustrates operation of the programmable diffraction grating for diffracting an incident beam of light.

The central portion of each grating element 14 is substantially rectangular in plan with adjacent grating elements having substantially equal dimensions. Typical dimensions for each grating element may be, for example, as follows: the central portion 18 is rectangular with a width of about 2–10 microns, a thickness of about the width or smaller, and a length of up to about 100 microns or more. The spacing between adjacent grating elements is generally smaller than the width of the grating elements. For forming a device 10 that operates as a first-order diffraction grating, a periodicity, d, of the grating elements as shown in FIG. 8 is about equal to a wavelength of an incident light beam; whereas a device that operates as a higher-order diffraction grating may be formed with a periodicity, d, being larger than the wavelength of the light beam. The flexible members 20 surrounding the central portion 18 on each end thereof preferably have a width approximately equal to that of the central portion, a thickness of about one-third that of the central portion or less, and an overall length of about 10–40 microns.

Figure 5B:
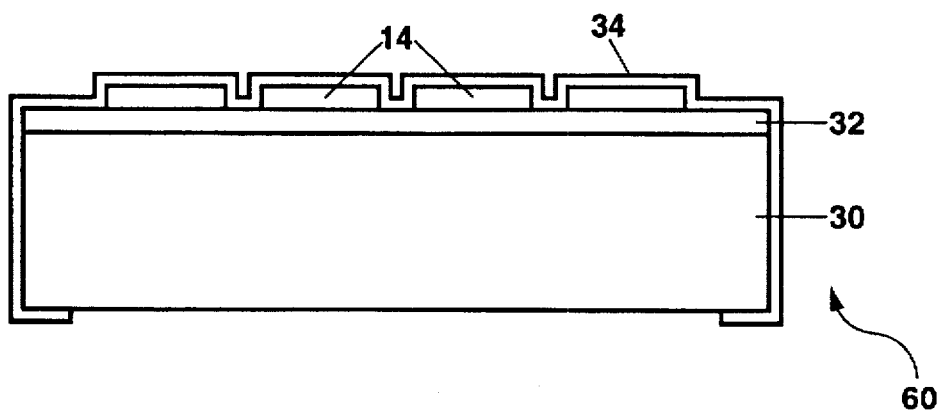

FIG. 5b shows a second process step for forming the upper portion 60 of the programmable diffraction grating. In FIG. 5b, a protective layer 34 of a material such as silicon nitride (e.g. stoichiometric or silicon-rich LPCVD silicon nitride, or the like) is formed over the exposed surfaces of the wafer 30, support layer 32, and grating elements 14 and patterned to expose the majority of the lower surface of the wafer for removal by etching. The protective layer 34 serves to protect the grating elements, support layer, and an annular outer portion of the wafer during a bulk micromachining process whereby majority of the wafer is etched away leaving the support frame 22. The protective layer 34 is preferably of a composition and thickness to provide a net lateral tensile stress for the combination structure formed by the protective layer, grating elements, and support layer when the majority of the wafer is removed during the bulk micromachining process so that the combination structure does not buckle or fracture as might possibly occur if the net stress were compressive.

Figure 5C:
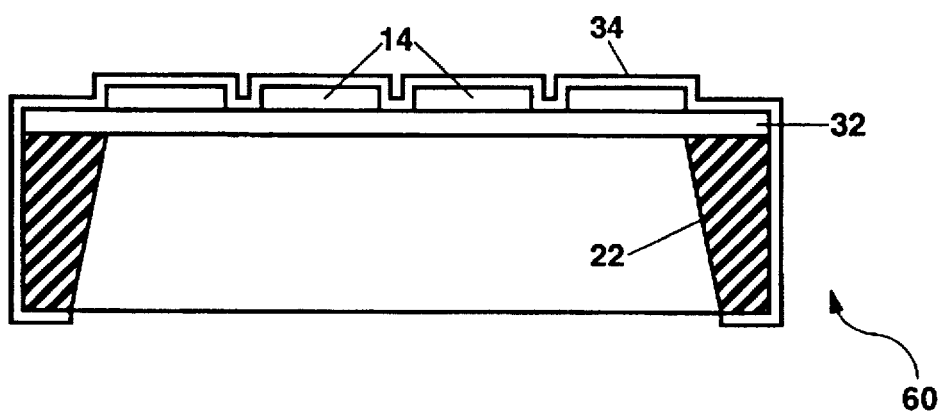

The bulk micromachining process as illustrated in FIG. 5c is preferably performed by contacting the exposed portion of the wafer 30 with an anisotropic etchant such as potassium hydroxide (KOH) or the like, with the protective layer 34 acting as an etch mask and the support layer 32 acting as an etch stop. The use of KOH as an anisotropic etchant generally forms sloping inner sidewalls for the support frame 22 by etching along (111) crystallographic planes as shown in FIG. 5c. These sloping sidewalls may be advantageous for increasing the angles of incidence and diffraction ($\theta_i$ and $\theta_d$, respectively) of the light beams during operation of the device, and for providing an improved optical access to the outermost grating elements.

Figure 5D:
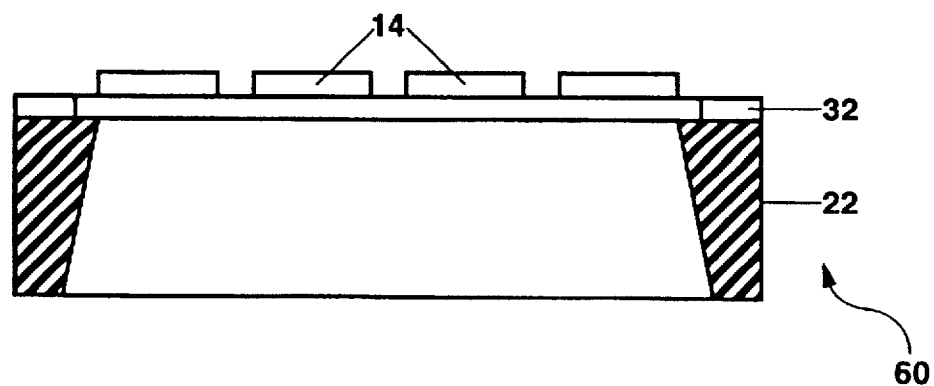

In the step of FIG. 5d, the protective layer 34 and the majority of the support layer 32 (except for an annulus supporting the grating elements by the flexible members thereof) are removed thereby releasing the grating elements 14 for movement thereof. In FIG. 5d, the order of release of the grating elements is important, especially when the support layer 32 is a thermal oxide which is typically in compression. In this case, the oxide support layer 32 is preferably removed first by etching with hydrofluoric acid (HF) which leaves the grating elements with a smooth mirror-like surface for later forming the light-reflective upper surface of the completed device. After removal of the oxide support layer 32, the protective layer 34 (e.g. silicon nitride) may be removed by etching. Complete removal of the protective layer 34 may be performed by using a wet etchant with controlled gentle agitation to prevent breakage of the fragile grating elements; or otherwise a dry etching method such as plasma etching may be used to selectively remove the protective layer on the grating-element side of the upper portion 60. The use of a dry etching process may be advantageous for removing the protective layer 34 from over the grating elements 14 while protecting the smooth mirror-like surface below the grating elements from possible plasma-induced damage since stringer portions of the protective layer may remain on the sides of the grating elements.

To complete formation of the upper portion 60, the grating elements 14 are preferably coated with a thin metal layer (e.g. aluminum, gold, silver, nickel, tungsten and alloys thereof) having a thickness of about 50–100 nanometers or more that is deposited on the lower surface of the grating elements in FIG. 5d. This metal layer preferably forms, at least in part, the moveable electrode (the moveable electrode may be further defined by an impurity doped region of the grating elements). Furthermore, the metal layer preferably provides, at least in part, an electrical connection between the moveable electrode and a conductive support frame 22 (or to an annular ground electrode formed on the remaining portion of the support layer 32). Finally, the metal layer preferably forms, at least in part, the light-reflective upper surface or serves to enhance the reflectivity of a light-reflective upper surface formed of a micromachineable material (e.g. silicon). (It should be noted that the lower surface of the grating elements in FIG. 5d becomes the light-reflective upper surface of the grating elements in the completed device of FIG. 3a.) The particular metal to be deposited may be selected to provide a high reflectance over a particular wavelength range of operation of the device. In some embodiments of the present invention, the material (i.e. grating layers) underlying the overcoated metal layer may then be completely removed beyond the central portion 18 so that the remaining metal layer forms the flexible member 20. Such a metal flexible member 20 may replicate the shape of the removed material, forming a planar leaf-spring, corrugated hinge, or a pair of serpentine planar microsprings.

The grating elements 14 are preferably permanently electrically grounded to minimize any electrostatic interaction or electrical interference therebetween, and to allow the elements to be spaced as closely together as desired, short of causing frictional interference during translatory motion thereof. Such electrical grounding may be, for example, to an electrically conductive support frame 22, or to an annular ground electrode surrounding the plurality of grating elements.

The programmable diffraction grating 10 is formed by attaching the upper portion 60 to the lower portion 50 as shown in FIG. 3a. The portions (50 and 60) may be aligned by means of alignment features patterned and etched into the remaining portion of the support layer 32 for receiving the support posts 26, or by means of metal pads formed on the exposed surface of the support layer at locations corresponding to the support posts. The portions (50 and 60) may be attached by an adhesive, solder, thermocompression bonding, or diffusion bonding. For thermocompression or diffusion bonding a suitable metal or metal alloy such as gold, nickel or the like may be deposited upon the support posts 26 and used for the metal pads to aid in bonding the portions (50 and 60).

Electrical connections to the programmable diffraction grating may be made by wire bonds to a plurality of bonding pads interconnected to the stationary electrodes and to the moveable electrodes. In embodiments of the present invention having addressing circuitry formed on the substrate prior to attachment of the upper portion 60, the stationary electrodes may be connected directly to the addressing circuitry, with one or more electrical inputs being provided to a serial or parallel interface of the addressing circuitry for operation of the device.

Figure 6:
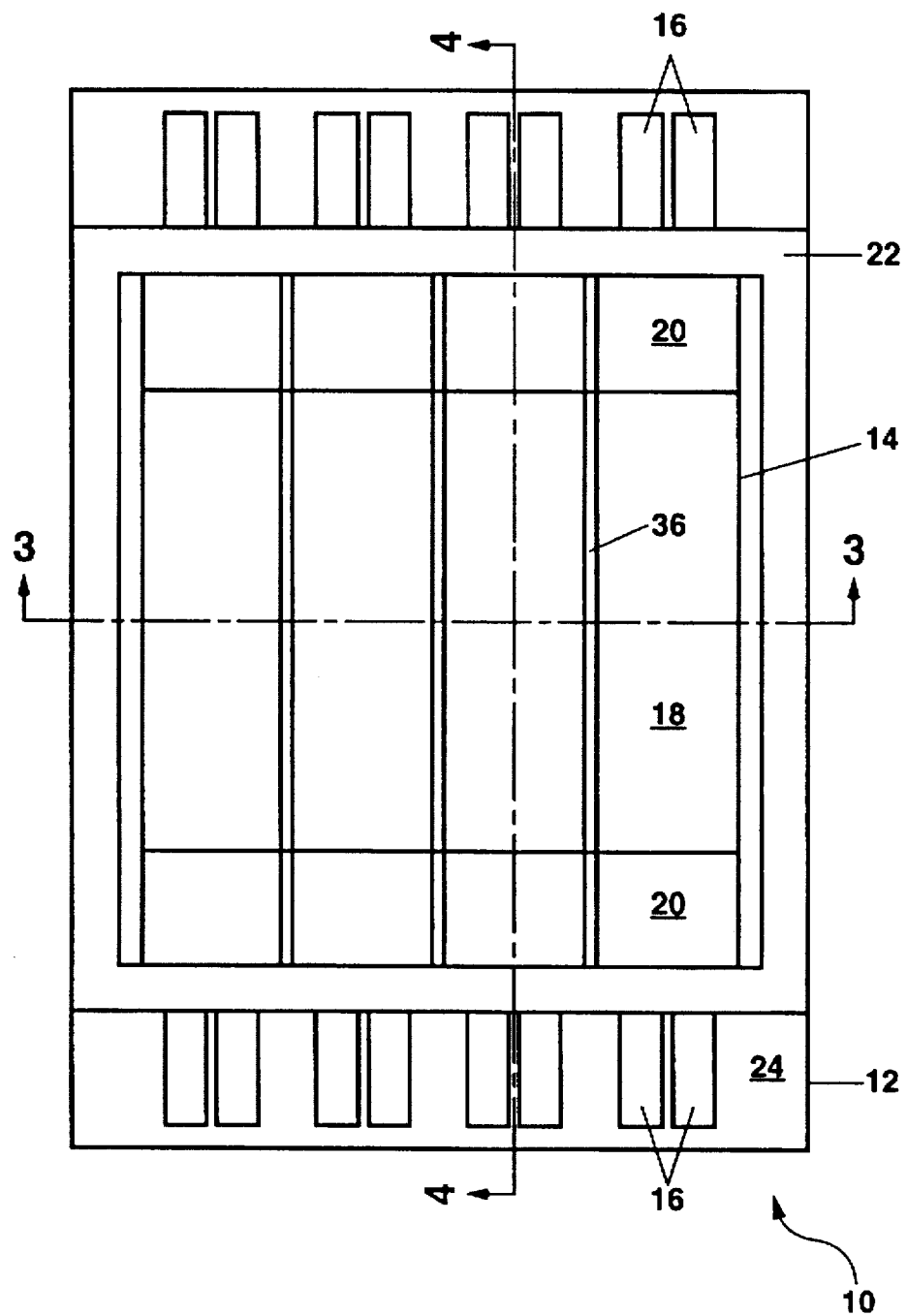
FIG. 6 shows a plan view of the programmable diffraction grating according to a second embodiment of the present invention.

According to a second embodiment of the present invention as shown in the plan view of FIG. 6 and in the cross-section views of FIG. 7, the support posts 26 may provide for an electrical interconnection between the moveable electrodes and a ground electrode on or above the substrate. In the second embodiment, guard electrodes 36 are also provided between each pair of stationary electrodes 16, with the guard electrodes preferably being located to intercept the central portion 18 of the grating elements after a predetermined range of motion thereof. The guard electrodes may be formed by depositing an electrically-conductive material such as the metal or metal alloy used for formation of the support posts 26. Formation of the guard electrodes may include deposition of a thin patterned seed layer and subsequent metal plating thereon. (The process steps for forming the guard electrodes may occur at least partially concurrent with the formation of the support posts 26, although separate masking and plating steps may be used to provide for a larger height of the plated support posts.)

A primary function of the grounded guard electrodes 36 is to reduce the possibility for any electrostatic interaction or cross-talk between each grating element and adjacent stationary electrodes not directly underlying the grating element. A secondary function of the guard electrodes 36 in a preferred embodiment thereof is to form stops for limiting the range of translatory motion of the grating elements to a stable operating range and for preventing contact of the grating elements with one or more stationary electrodes therebelow which may result in stiction and/or a shorting out the programming voltage applied between the grating element and the stationary electrodes.

In the second embodiment of the programmable diffraction grating in FIGS. 6 and 7, four stationary electrodes 16 are provided below each grating element, with the stationary electrodes being overcoated, at least in part, by a passivation layer 28 (e.g. silicon dioxide, silicon nitride, polyimide, spin-on glass, or the like) for environmental protection and/or for electrical isolation. The passivation layer 28 may be patterned to provide openings for defining the locations of the support posts 26 and the guard electrodes 36. (In the absence of guard electrodes 36 protruding into the path of the grating elements and forming stops, such stops may be formed by patterning the passivation layer 28 and forming a plurality of outward protrusions therein below the grating elements to limit travel and to prevent stiction.)

By independently addressing the four electrodes underlying each grating element with separate programming voltages, the parallelism of each grating element may be adjusted to overcome any deflection (e.g. rotation or tilting) of the central portion 18 that might otherwise arise from irregularities or nonuniformities within the grating element (especially from slightly mismatched flexible members). The exact programming voltages necessary for operation of each grating element over a range of translatory motion thereof may be determined (e.g. from an optical measurement of a diffraction pattern generated by a focused light beam reflected from the grating element and adjacent elements) and stored (within a memory portion of the addressing circuitry or an external memory) as a calibration set (or as a calibration function from which the programming voltages may be calculated to provide a predetermined range of translatory motion) for recall and use during operation of the device.

In other embodiments of the present invention, additional stationary electrodes 16 may be provided below the central portion of the grating elements as sensory electrodes for capacitively sensing the position (i.e. vertical spaced relationship) of each grating element. The sensory electrodes may be connected to control circuitry (e.g. included as a part of the addressing circuitry) for providing a closed feedback loop for accurately controlling and/or adjusting the vertical spaced relationship between adjacent grating elements in the device.

The programmable diffraction grating 10 may further be packaged within an enclosure having a light-transmissive window (preferably with anti-reflection coatings for the wavelength range of operation of the device) above the grating elements for environmental protection of the device. Such an enclosure may also be advantageous for controlling the composition and pressure of an ambient atmosphere (e.g. an inert gas such as $N_2$, Ar, etc.) surrounding the plurality of grating elements to aid in damping any modes of oscillation of the grating elements that may arise from irregularities therein (e.g. slightly mismatched flexible members) or from abrupt variations in the programming voltages during alteration of the vertical spaced relationship of one or more grating elements.

Operation of the electrically-programmable diffraction grating is illustrated in FIG. 8 for the first embodiment of the present invention. During operation of the device, each grating element 14 may be translated vertically with respect to the underlying stationary electrode 16 by applying a programming voltage between the stationary and moveable electrodes, thereby forming an air gap capacitor with opposite electrical charges being induced on each electrode to generate an electrostatic force of attraction that acts to move the grating element downward towards the stationary electrode.

In FIG. 8, light rays 100 from one or more incident light beams 102 may be received onto the light-reflective upper surfaces of a plurality of the grating elements and reflected therefrom. (Although FIG. 8 describes operation of the device for only two adjacent grating elements, in actual operation of the device a large number of grating elements will be involved for receiving the incident light beams and generating diffracted beams.) The reflected light rays travel over different paths to and from the grating elements, thereby producing a phase shift between the light rays which leads to the formation of a diffracted light beam 104. As shown in FIG. 8, the light rays reflected from any two adjacent grating elements will be in phase when the vertical spaced relationship, s, between the two grating elements satisfies the equation:

$$d(\sin\theta_i + \sin\theta_d) + s\left(\frac{1}{\cos\theta_i} + \frac{1}{\cos\theta_d}\right) = n\lambda$$

where d is the periodicity of the grating elements, $\theta_i$ is the angle of incidence of the light beam 102 (as measured from the normal to the substrate 12), $\theta_d$ is the angle of diffraction of the light beam 104 reflected off the grating, n is an integer, and $\lambda$ is the wavelength of the light beam.

According to the above equation, for predetermined and fixed values of d, $\theta_i$, $\theta_d$, and s, only one wavelength of light, $\lambda$, is coupled to a slit, aperture, optical fiber, or detector located at the predetermined angle of diffraction, $\theta_d$. Alternately, for a predetermined and fixed periodicity, d, the diffracted light beam may be scanned in angle (i.e. the angle $\theta_d$ of the diffracted beam 104 may be varied) by varying the vertical spaced relationship, s, between adjacent grating elements. Thus, the electrically-programmable diffraction grating, when utilized in conjunction with one or more suitably sized and positioned entrance and exit slits, apertures, optical fibers or detectors, permits formation of optical instruments such as a correlation spectrometers, scanning spectrometers, an analog- or digital-type switching apparatus, or the like.

Furthermore, for a fixed periodicity, d, and a fixed vertical spaced relationship, s, a polychromatic light beam (or a plurality of light beams of differing wavelengths) may be dispersed over a range of diffraction angles, $\theta_d$, determined according to the above equation by the wavelength, $\lambda$, for each wavelength component of the beam(s). This allows the electrically-programmable diffraction grating to be used as an optical filter or spectrometer for dispersing (i.e. separating or demultiplexing) and analyzing polychromatic light beams.

Finally, the diffraction grating may be programmed for use as a correlation spectrometer or multiplexer for combining two or more selected wavelengths of light and providing a common diffraction angle, $\theta_d$, for the two or more selected wavelengths. This may be achieved, for example, by providing a value for the vertical spaced relationship, s, for each grating element that simultaneously satisfies the above equation for a plurality of different wavelengths of light (e.g. $\lambda_1, \lambda_2, \ldots, \lambda_m$) and different integers (e.g. $n_1, n_2, \ldots, n_m$) such that $n\lambda = n_1\lambda_1 = n_2\lambda_2$ etc.

Alternately, the grating elements may be provided with a multi-periodic spaced relationship defined by a plurality of different preselected periodicities $d_1, d_2 \ldots d_m$, with each value of d satisfying the above grating equation for a different preselected wavelength of light, $\lambda_1, \lambda_2, \ldots, \lambda_m$. Such a multi-periodic diffraction grating 10 is advantageous for generating a detection spectrum of dispersed light in a correlation spectrometer in which a plurality of different wavelengths of light are overlapped or collocated in space with a substantially identical angle of diffraction, $\theta_d$. In this way, a plurality of spectral bands or peaks may be transmitted through a single slit, aperture, optical fiber or the like located at the angle of diffraction, $\theta_d$; or be detected by a single detector located thereat. The detection of a plurality of spectral peaks in this manner is advantageous for increasing the sensitivity of a correlation spectrometer for the analysis or detection of a particular material of interest; and also for forming a multiplexer or demultiplexer for a plurality of light beams.

The vertical spaced relationship for a plurality of grating elements may be predetermined according to the above equation, with the programming voltages required for translatory motion of the grating elements being provided by the addressing circuitry or by external programming means such as a computer connected to addressing circuitry on the substrate 12 (or to bonding pads on the substrate interconnected to the plurality of stationary and moveable electrodes). One or more calibration sets of predetermined programming voltages may also be stored digitally within a memory portion of the addressing circuitry (or within the external programming means) and retrievable therefrom for generating the programming voltages (e.g. by a digital-to-analog converter included in the addressing circuitry) for moving the grating elements into one or more predetermined positions (each vertical position being selectable by instructions stored within the memory or provided by the external programming means) during operation of the electrically-programmable diffraction grating.

The programming voltages may vary in the range of about 0–50 volts or higher depending on the vertical spacing between the grating elements 14 and the underlying stationary electrodes 16, and the programmed translation distance for a particular grating element. In some embodiments of the present invention, the programming voltages may further include a small alternating-current component at a predetermined modulation frequency for dithering the vertical position of the grating elements to generate a modulated feedback signal from the sensory electrodes or to generate a modulation component within the diffracted light beam for use in synchronous detection thereof.

The range of programming voltages required for operation of a particular grating element 14 will in general depend on the compliance of the flexible members 20 of the grating elements and also on the predetermined range of translatory motion. If the flexible members of a particular grating element are made longer or thinner or narrower or a combination thereof, the translatory motion of the grating element may be increased for a particular value of the programming voltage (or alternately a reduced programming voltage may be used to provide a specified range of translatory motion), since with typical electrostatic actuation the compliance of the flexible member varies linearly with the inverse of the width and directly with the fourth power of its length and inversely with the cube of its thickness. Thus, a range of programming voltages may be predetermined that are compatible with integrated circuits for forming the addressing circuitry on the same substrate as the grating elements, thereby greatly reducing the number and complexity of external connections to the programmable diffraction grating.

The range of translatory motion for the grating elements may be divided into a stable range of motion, and an unstable range of motion. The stable range of motion for each grating element is limited to about one-third of the distance between the untranslated position (i.e. the rest position at zero programming voltage) of the grating element and the position of contact with the underlying stationary electrode(s). For this stable range of motion, the electrostatic force of attraction between each grating element and underlying stationary electrode(s), which increases nonlinearly as the grating element approaches the stationary electrode, is balanced by the restoring force of the flexible members which varies approximately linearly with distance. Thus, over the stable range of motion, each grating element may be translated by a vertical distance that varies with the magnitude programming voltage, with the translatory motion being variable and controllable (albeit nonlinear with the applied programming voltage). Either analog or digital operation of the grating elements is possible within the stable range of motion. Furthermore, in some embodiments of the present invention the programmable diffraction grating may be restricted to operation within the stable range of motion by setting the height of stops at one-third or less of the distance between the untranslated position of the grating elements and the underlying stationary electrodes, or by limiting the programming voltages to a value below a collapse voltage for which motion of the grating elements becomes unstable.

When the grating elements are translated beyond the stable range of motion the ever-increasing force of attraction overcomes the restoring force, with the movement of the grating element becoming unstable and the grating element quickly being forced into contact with the stationary electrode (or preferably with a stop thereabove). This instability limits the grating elements to digital operation within the unstable range of motion, with each grating element being either in the untranslated position or in a stop position (defined by a stop such as a guard electrodes 36 or the passivation layer 28 into which the central portion of the grating element is brought into contact when the programming voltage is greater than or equal to the collapse voltage).

The vertical spaced relationship, s, between adjacent grating elements may be determined according to the above equation. In order to provide for the translation of a large number of grating elements each being spaced by an amount s while at the same time restricting the motion to the stable range, it should be noted that the position of any grating element may be shifted by an amount that produces a change of $\lambda$ or a multiple thereof difference in an optical path length of the diffracted light rays 100. Such a difference in optical path length may be produced by an upward or downward change in the vertical spaced relationship, s, between adjacent grating elements of an integral multiple of $$\lambda \frac{\cos\theta_i \cos\theta_d}{\cos\theta_i + \cos\theta_d}.$$

Thus, any grating element that must otherwise be translated beyond the stable range of motion may be shifted upwards by an amount as given above so that an overall range of translatory motion for the grating elements need not exceed a distance larger than $\lambda/2$. Due to the periodicity on the translatory motion imposed by a periodic phase relationship of the diffracted light rays some embodiments of the present invention may have stationary electrodes that are interconnected at regular intervals to reduce the number of different programming voltages required for operation of the device (such regular interconnections may also be used when the range of translatory motion is limited to discrete values as may occur, for example, when a four-bit digital to analog converter is used to provide the programming voltages).

The matter set forth in the foregoing description and accompanying drawings is offered by way of illustration only and not as a limitation. Other applications and variations of the electrically-programmable diffraction grating will become evident to those skilled in the art. The actual scope of the invention is intended to be defined in the following claims when viewed in their proper perspective based on the prior art.

What is claimed is:

1. An electrically-programmable diffraction grating for receiving an incident beam of light and generating a diffracted beam of light therefrom, comprising:
   (a) a substrate;
   (b) a plurality of elongate grating elements supported above the substrate in a horizontal spaced relationship, each grating element further comprising a central portion connected at each end thereof to at least one flexible member which is attached to a support frame above the substrate and surrounding the plurality of grating elements, the central portion of each grating element further including a light-reflective upper surface and forming at least in part a moveable electrode, and;
   (c) at least one stationary electrode formed on the substrate below each grating element for forming in combination with the moveable electrode a set of electrodes for electrostatically defining a substantially parallel vertical spaced relationship between the light-reflective upper surface of each grating element and adjacent grating elements for diffracting the incident beam of light as it is reflected from the upper surfaces of the grating elements.

2. The electrically-programmable diffraction grating of claim 1 further including addressing circuitry connected between each set of stationary and moveable electrodes for applying a programming voltage between each stationary electrode and the overlying moveable electrode for electrostatic actuation and control of the grating elements.

3. The electrically-programmable diffraction grating of claim 1 wherein the substrate comprises a material selected from the group consisting of metals, glasses, ceramics, sapphire, and semiconductors.

4. The electrically-programmable diffraction grating of claim 1 wherein the substrate comprises silicon.

5. The electrically-programmable diffraction grating of claim 1 wherein the plurality of grating elements comprise at least one micromachineable material selected from the group consisting of silicon, silicon dioxide, silicon nitride, metals, and metal alloys.

6. The electrically-programmable diffraction grating of claim 1 further including a passivation layer overlying at least in part the stationary electrodes.

7. The electrically-programmable diffraction grating of claim 1 further including a guard electrode between each pair of stationary electrodes.

8. The electrically-programmable diffraction grating of claim 7 wherein each guard electrode forms a stop for limiting a translatory motion of the grating elements.

9. The electrically-programmable diffraction grating of claim 1 wherein the support frame is electrically conductive, and the plurality of moveable electrodes are electrically connected thereto.

10. The electrically-programmable diffraction grating of claim 9 wherein the support frame is further electrically connected to a ground electrode formed on the substrate by at least one electrically-conducting support post located therebetween.

11. The electrically-programmable diffraction grating of claim 1 wherein each flexible member is substantially planar with a thickness being substantially smaller than the thickness of the central portion of the grating elements.

12. The electrically-programmable diffraction grating of claim 1 wherein each flexible member has a corrugated hinge structure comprising a plurality of parallel corrugations aligned substantially along a minor axis of the elongate grating elements.

13. The electrically-programmable diffraction grating of claim 1 wherein each flexible member comprises a pair of juxtaposed serpentine planar microsprings, with one end of each microspring being attached near a corner of the central portion of the grating element, and the other end of each microspring being attached to the support frame.

14. The electrically-programmable diffraction grating of claim 1 wherein the central portion of each element includes a thin metal layer forming at least in part the light-reflective upper surface.

15. The electrically-programmable diffraction grating of claim 14 wherein the metal layer comprises a metal selected from the group consisting of aluminum, gold, silver, nickel, tungsten, and alloys thereof.

16. The electrically-programmable diffraction grating of claim 1 wherein the central portion of each grating element is substantially rectangular in plan, with adjacent grating elements having substantially equal dimensions.

17. The electrically-programmable diffraction grating of claim 2 wherein the addressing circuitry provides a plurality of programming voltages, with each programming voltage being applied between at least one stationary electrode and a moveable electrode of each grating element for varying and controlling the vertical spaced relationship of each grating element.

18. The electrically-programmable diffraction grating of claim 17 wherein the substrate is silicon, and the addressing circuitry is formed at least in part on the substrate.

19. The electrically-programmable diffraction grating of claim 18 wherein the addressing circuitry comprises an integrated circuit.

20. The electrically-programmable diffraction grating of claim 17 wherein each programming voltage includes an alternating-current component having a predetermined modulation frequency.

21. The electrically-programmable diffraction grating of claim 17 wherein at least one of the stationary electrodes for each grating element is a sensory electrode for capacitively determining in combination with the moveable electrode the vertical spaced relationship of the grating element.

22. The electrically-programmable diffraction grating of claim 21 wherein the addressing circuitry further includes control circuitry responsive to an input from each sensory electrode for maintaining a fixed vertical spaced relationship of each grating element relative to adjacent grating elements.

23. The electrically-programmable diffraction grating of claim 1 wherein the plurality of grating elements are programmable to provide a multi-periodic spaced relationship for directing a plurality of wavelengths of the incident beam of light to a common point in space.

24. The electrically-programmable diffraction grating of claim 1 further including an enclosure surrounding the grating elements for controlling an ambient atmosphere thereabout.

25. An electrically-programmable diffraction grating for receiving an incident beam of light and generating a diffracted beam of light therefrom, comprising:

(a) a substrate having a plurality of elongate stationary electrodes formed thereupon, the stationary electrodes being arranged substantially parallel to each other in a horizontal spaced relationship defined by a substantially equal spacing between adjacent stationary electrodes;

(b) a frame supported above the substrate and having attached thereto a plurality of elongate grating elements, each grating element being superposed above one of the stationary electrodes, each grating element further comprising a central portion and at least one flexible member at either end thereof, the central portion having a light-reflective upper surface and forming at least in part a moveable electrode; and (c) addressing circuitry electrically connected between each stationary electrode and the moveable electrode thereabove for providing a plurality of programming voltages to electrostatically actuate the moveable electrodes to vary a vertical spaced relationship between each grating element and adjacent grating elements.

26. The electrically-programmable diffraction grating of claim 25 wherein the substrate comprises a material selected from the group consisting of metals, glasses, ceramics, sapphire, and semiconductors.

27. The electrically-programmable diffraction grating of claim 26 wherein the substrate comprises silicon.

28. The electrically-programmable diffraction grating of claim 27 wherein the addressing circuitry is formed at least in part on the substrate in the form of an integrated circuit.

29. The electrically-programmable diffraction grating of claim 25 wherein the grating elements comprise at least one micromachineable material selected from the group consisting of silicon, silicon dioxide, silicon nitride, metals, and metal alloys.

30. The electrically-programmable diffraction grating of claim 25 further including at least one sensory electrode below each moveable electrode for sensing the vertical spaced relationship of the grating element and providing an electrical input to the addressing circuitry for controlling the vertical spaced relationship.

31. The electrically-programmable diffraction grating of claim 25 wherein the grating elements are programmable to provide a multi-periodic spaced relationship for directing a plurality of wavelengths of the incident light to a common point in space.

32. The electrically-programmable diffraction grating of claim 25 further including an enclosure surrounding the grating elements for controlling an ambient atmosphere thereabout.

* * * * *